(12) United States Patent
Kugler et al.

(10) Patent No.: US 8,447,016 B1
(45) Date of Patent: May 21, 2013

(54) SYSTEM AND METHOD FOR EMULATING CALL CENTER SCREEN-POP APPLICATION

(75) Inventors: Joshua Kugler, Buffalo Grove, IL (US); Frederick Marshall Feldman, Evanston, IL (US); Irvin M. Shapiro, Skokie, IL (US)

(73) Assignee: Ifbyphone, Inc., Chicago, IL (US)

( * ) Notice: Subject to any disclaimer, the term of this patent is extended or adjusted under 35 U.S.C. 154(b) by 1134 days.

(21) Appl. No.: 12/371,081

(22) Filed: Feb. 13, 2009

Related U.S. Application Data (60) Provisional application No. 61/028,394, filed on Feb. 13, 2008.

(51) Int. Cl.
*H04M 11/00* (2006.01)
*G06Q 30/00* (2012.01)

(52) U.S. Cl.
USPC ................... 379/93.23; 705/26.41

(58) Field of Classification Search
USPC .............. 379/93.01, 93.17, 93.23; 705/26.41
See application file for complete search history.

(56) References Cited

U.S. PATENT DOCUMENTS

| | | | | |
|---|---|---|---|---|
| 7,035,388 | B2 * | 4/2006 | Kurosaki | 379/142.06 |
| 7,684,550 | B2 * | 3/2010 | McCullough et al. | 379/93.17 |
| 8,179,882 | B1 * | 5/2012 | Friedman et al. | 370/352 |
| 2002/0178077 | A1 * | 11/2002 | Katz et al. | 705/26 |
| 2005/0097000 | A1 * | 5/2005 | Freishtat et al. | 705/26 |
| 2005/0154648 | A1 * | 7/2005 | Strause | 705/26 |
| 2007/0136310 | A1 * | 6/2007 | Derrico | 707/10 |
| 2008/0104596 | A1 * | 5/2008 | Buonanno et al. | 718/101 |

OTHER PUBLICATIONS

Fonality PBXtra—Standard vs. Professional vs. Call Center Edition Comparision, published on internet website: http://pbxtra.fonality.com/products/pbxtra/edition-comparison.html (May 1, 2009).

Visual Rapport, Visucal Communication Console for TAPI Service Providers, Nortel BCM LAN CTE and Avaya IP Office, "Visual Rapport is an intuitive, integrated visual communication console that provides real time employee telephone status, instant messaging, email, screen pop, call logging and file transfer all under one roof," published on internet website: http://www.telecost.com/raptapi.htm (May 1, 2009).

Screen Pop, Call-Center-Tech.com, published on internet website: http://www.call-center-tech.com/screen-pop.htm (May 1, 2009).

Night Answering Solutions, Call-Center-Tech.com, published on internet website: http://www.call-center-tech.com/night-answering.htm (May 1, 2009).

(Continued)

*Primary Examiner* — Christopher M Brandt
(74) *Attorney, Agent, or Firm* — Drinker Biddle & Reath LLP (57) ABSTRACT

A system and method are provided for establishing interactive communications between a customer and an agent of a merchant using a third-party. The customer is provided with a link that accesses a data entry element, such as a form, via which the customer can provide additional information to the agent. The third-party receives the entered customer information and forwards it on to the agent via, e.g., a screen pop. If the agent determines that the call should be accepted, the third-party facilitates connecting the agent with the customer.

27 Claims, 5 Drawing Sheets

OTHER PUBLICATIONS

Call Monitoring, Call-Center-Tech.com, published on internet website: http://www.call-center-tech.com/call-monitoring.htm (May 1, 2009).

Auto Attendant, Call-Center-Tech.com, published on internet website: http://www.call-center-tech.com/auto-attendant.htm (May 1, 2009).

Vitual ACD, Call-Center-Tech.com, published on internet website: http://www.call-center-tech.com/virtual-acd.htm (May 1, 2009).

Virtual Receptionist, Call-Center-Tech.com, published on internet website: http://www.call-center-tech.com/virtual-receptionist.htm (May 1, 2009).

Call Distribution, Call-Center-Tech.com, published on internet website: http://www.call-center-tech.com/call-distribution.htm (May 1, 2009).

IVR Vendor, Call-Center-Tech.com, published on internet website: http://www.call-center-tech.com/ivr-vendor.htm (May 1, 2009).

Cisco₁ CTI (Release 4.6), Cisco ICM Software Release 4.6 CTI OS Product Description, published on internet website: http://www.cisco.com/en/US/docs/voice_ip_comm/cust_contact/contact_center/ctios/ctios4_6x/feature/guide/ctipd2.html (May 1, 2009).

* cited by examiner

PLEASE CONTACT TECHNICAL SUPPORT FOR SOFTWARE-RELATED PROBLEMS

PHONE

FIRST NAME*

LAST NAME*

E-MAIL ADDRESS

BEST TIME TO CALL BACK IF NO ONE IS AVAILABLE TO TAKE YOUR CALL NOW

CLICK TO CALL

*DENOTES REQUIRED FIELD

SYSTEM AND METHOD FOR EMULATING CALL CENTER SCREEN-POP APPLICATION

BACKGROUND

Computer telephone integration (CTI), relates to any system that employs a computer to enhance or control telephony such as placing and answering calls. CTI is typically implemented in call center environments by interfacing computers (e.g., servers storing customer database records, call center agents' PCs, etc.) with telephones (e.g., call center agents' Private Branch Exchange (PBX) phone terminals). In one example, a call center CTI system receives a call and routes the call to an available agent of a merchant (e.g., using an Automatic Call Distributor (ACD) of the call center's Call Management System (CMS)) so that the agent can assist the calling party in making a purchase from the merchant, or handling other related matters.

Based on Automatic Number Identification (ANI) or received caller-ID information of the call, the CTI system determines the calling party so that information regarding the calling party (e.g., previous calls regarding inquiries and/or orders, demographic information, etc.) can be presented to the agent on his or her computer display as what is known as a "screen-pop". In this way, the call center can provide consistent, personalized customer service to the calling party regardless of which agent is assisting the calling party.

Many small and medium sized businesses are unable to enjoy the benefits of CTI systems because CTI systems, which comprise hardware (Customer Premise Equipment (CPE) such as a PBX) and software such as the aforementioned ACD and CMS, are expensive to purchase and maintain. Furthermore, because such systems require a number of dedicated agents (e.g., six to ten people) for answering calls, CTI systems are impractical for many small and medium sized businesses. In view of the foregoing, a third-party hosted, Internet-based method of emulating call center screen-pop functionality would be an important improvement in the art.

SUMMARY

A system and method is provided for establishing communication between a computer user (hereinafter referred to for convenience as the customer) who is viewing a web page (e.g., blog), email, electronic document, etc., and a second individual (hereinafter referred to for convenience as the agent), for example, a customer service employee or salesperson of a merchant whose web page or email the customer is viewing. Note that the merchant and the agent of the merchant should be construed herein to represent the same entity.

Accordingly, a method provides for establishing interactive communications between a customer and a merchant, comprising: providing a link to the customer for accessing a data entry element on a customer computer comprising application programs; the customer entering customer information into the data entry element; the customer sending the customer information to a third-party at a contact time, thereby initiating merchant communications; the third-party sending, generally at the contact time, the customer information to the merchant, and, generally at the contact time, the third-party calling the merchant, if contact rules permit; the merchant accessing the customer information and determining whether to engage in interactive communications with the customer generally at the contact time; and engaging in interactive communications with the customer generally at the contact time if the merchant has determined to do so.

Additionally, another method provides for establishing interactive communications between a customer and a merchant, comprising: assigning a phone number to the merchant and physically associating the phone number with a third-party; the customer calling the phone number at a contact time; the third party utilizing ANI or received caller-ID information to look up additional demographic information from a data source; the third party sending the additional demographic information to the merchant using an instant messaging client as a screen pop generally at the contact time; if a rule has been established with the merchant that it will not take the call having characteristics of the call, then transferring the call to an answering machine or an attendant; otherwise the merchant reviewing the additional demographic information; the third party calling the merchant and asking if the merchant wishes to receive the call; if the merchant wishes to receive the call, then transferring the customer call to the merchant, otherwise, transferring the call to the answering machine or the attendant; and the merchant engaging in interactive communications with the customer generally at the contact time.

Finally, a system provides for establishing interactive communications between a customer and a merchant, comprising: a merchant computer comprising an input via which an instant message is input, the merchant computer comprising an algorithm for providing the instant message as a screen-pop message on a display device of the merchant computer; a third-party server connected to the merchant computer via a network; a customer computer comprising a connection to the network, and a data entry element for entering customer information into a data entry element at a contact time; wherein the customer computer comprises an algorithm for providing the customer information to the third-party server; and the third-party server comprises: an algorithm for sending the customer information to the merchant computer as an instant message; a rule that determines whether the merchant will engage the customer at the contact time; and a transfer element permitting interactive engagement between the customer and the merchant at the contact time if the rule permits.

DESCRIPTION OF THE DRAWINGS

The invention is described in more detail below with reference to the various embodiments illustrated in the drawings.

DETAILED DESCRIPTION OF THE PREFERRED EMBODIMENTS

Figure 1:
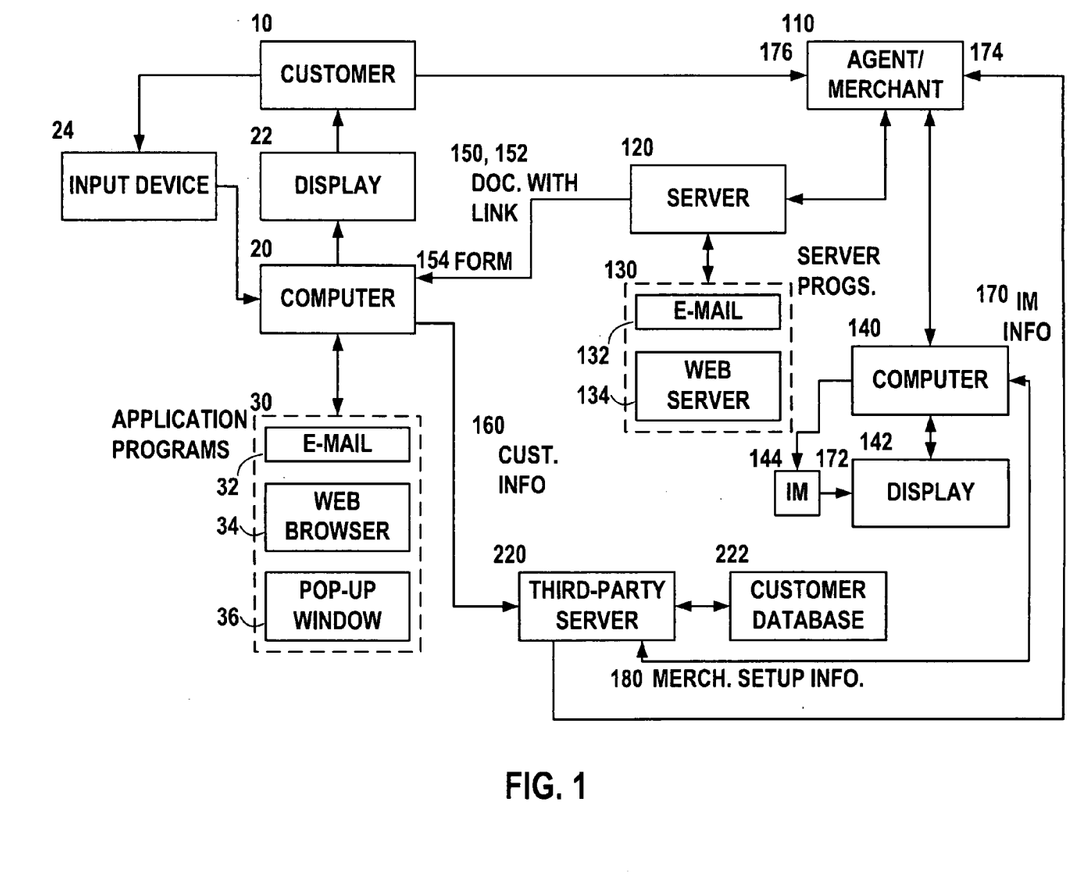
FIG. 1 is a block diagram illustrating the primary components according to an embodiment of the invention in which a link is provided to the customer.

The following detailed description details various preferred embodiments of the invention. FIG. 1 is a block diagram illustrating the major components of the system. The customer 10 utilizes a computer 20 in order to interact with the agent and third-party systems described in more detail below. The computer 20 could be any type of computing device that permits user access to documents containing links and some mechanism for filling out forms. This could be a desktop computer, laptop computer, PDA, smart phone, etc.

The customer's computer comprises a display 22, such as a monitor or viewing screen, and input devices 24, such as a mouse (for selecting the link in the displayed document) and keyboard (for form data entry).

The computer 20 further comprises application programs 30 that permits the display of a document comprising a link. Such a document could be formatted, e.g., in the hypertext markup language (HTML) or any other language permitting a link to another location. Exemplary programs serving as application programs 30 could include a web client/browser 32, such as Microsoft's Internet Explorer® or Mozilla's Firefox®, and could also include an e-mail client 34, such as Microsoft's Outlook®.

In an embodiment of the invention, the merchant 110 has a server computer 120 with, e.g., an e-mail server 122 or web server 124 by which it can send customers 10 a document/data structure 150 (FIG. 2) comprising relevant information for establishing contact with an agent or customer support person of the merchant 110. It should be noted that although the document 150 is shown as originating from the agent's server 120, it could easily originate from the third-party server 220 or any other source as well.

Figure 2:
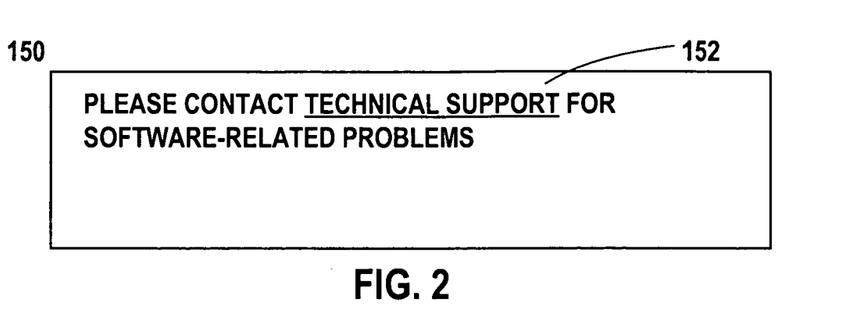
FIG. 2 is an exemplary screen shot of a document comprising a link that is sent to the customer.

This document 150 comprises a link 152 that the customer can activate that provides the customer a form 154 for entering relevant information. This link 152 is a unique "click-to-contact" link (e.g., a URL, a software button that triggers, e.g., a complex Javascript function or an HTML anchor tag, etc.). The merchant 110 configures the document/data structure 150 (e.g., a web page, e-mail, etc.) with the click-to-contact link 152 so that the customer 10 can initiate contact with the agent 110 when the customer 10 views the document/data structure 150 and clicks on or otherwise activates the link 152.

When the customer 10 activates the link 152, the customer's computer 20 may launch a web browser 34 or pop-up window 36, or otherwise command an active web browser client 34 on the customer's computer 20 to navigate to or otherwise request a resource 154 associated with the link 152. The pop-up window 36 may be associated with the web browser 34 or could be a part of another application 30.

The browser 34 or pop-up window 36 being displayed 22 to the customer 10 prompts the customer 10 for information such as the customer's name and contact information (e.g., one or more of the customer's phone number, email address) by displaying a form 154 (FIG. 3) with fields that may facilitate entry of the information. Furthermore, the form 154 may ensure proper data format and communication of the customer's information 160 to the agent 110.

After the customer 10 enters his or her information 160 and activates a control, such as an OK button, to initiate contact with the agent 10, the information 160 is sent to a click-to-contact third party's server 220. The third party's server 220 processes the received information 160 from the customer 10 and initiates telephonic and/or text-based communication between the customer 10 and the agent 110.

Customer (form) information 160 is provided to a server 220 of a third party that uses this information in order to contact the merchant/agent 110.

In some embodiments, the third party server 220 may store at least some of the received information 160 from the customer 10 in a customer database 222 so that the merchant 110 can follow-up with the customer 10 by email, direct mail, phone, etc. to maintain the merchant-customer relationship. Although the example form 154 illustrated in FIG. 3 does not show prompting or asking the customer for the customer's instant messenger user ID, the form 154 may be configured or adapted to obtain that information so that the agent 110 may initiate a text-based real-time chat/instant messenger session with the customer 10.

Figure 3:
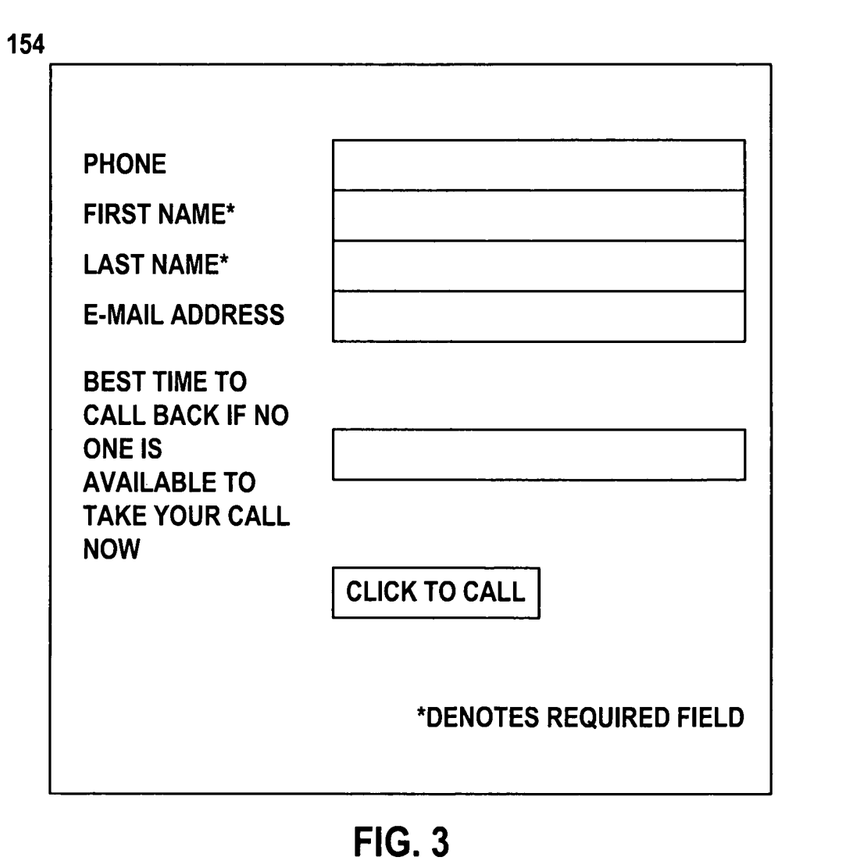
FIG. 3 is an exemplary screen shot of a data entry element provided to the customer.

Furthermore, as shown, the form 154 may be configured to collect information 160 (i.e., "Please contact me regarding:" field and "Additional information" field as shown) that the agent 110 may use to his or her advantage when contacting the customer 10 (e.g., to speak more knowledgeably regarding the customer's specific question or issue).

The third party's server 220 communicates at least a portion of the customer's received information 160 as instant messaging information 170 to an instant messenger (IM) client application 144 known in the art as, for example, AOL Instant Messenger (AIM), MSN Messenger, and Yahoo Messenger.

Based on merchant setup information 180 that the merchant/agent 110 provided to the third party 220 (e.g., during set-up of the merchant/agent account with the third party), the third party's server 220 communicates the merchant/agent instant messenger user ID to the instant messenger client application 144 and sends the instant message 170 that causes an instant messenger screen-pop 172 at a display 142 of the agent's computer or mobile device (e.g., PDA, smart phone, etc.) 140 with the customer's information 160.

Using the instant messenger screen-pop 172, the agent 110 can decide whether or not to establish contact with the customer 10. Furthermore, using the instant messenger screen-pop 172, the agent 110 can decide how or in what mode to establish contact 176 with the customer 10 (e.g., via phone, email, IM, chat, etc.) and provide personalized customer service. The third-party server 220 can then provide a mechanism 174 via which the customer 10 and the agent 110 can communicate.

In some instances, the customer 10 may request a specific method of communication with the agent 110 (e.g., text and phone-based communication). When requested by the customer 10 (or as a default setting), the click-to-contact server 220 may implement the instant messenger screen pop 172 substantially simultaneously with the steps of: a) the click-to-contact provider 220 establishing telephonic voice links 176 (or other forms of communication, such as chat, instant messaging, etc.) to the customer 10 and to the agent 110; and b) bridging the links so the customer 10 and agent 110 can communicate. If the phone-based communication is a default setting, embodiments of the present method may allow the agent 110 to cancel the call by, for example, preventing the call to the customer 10 or preventing the bridging.

The following example scenarios describe various embodiments of the present click-to-contact, instant messenger screen pop method.

Scenario 1—Contact Agent by Web-Initiated Click-to-Contact

Figure 4:
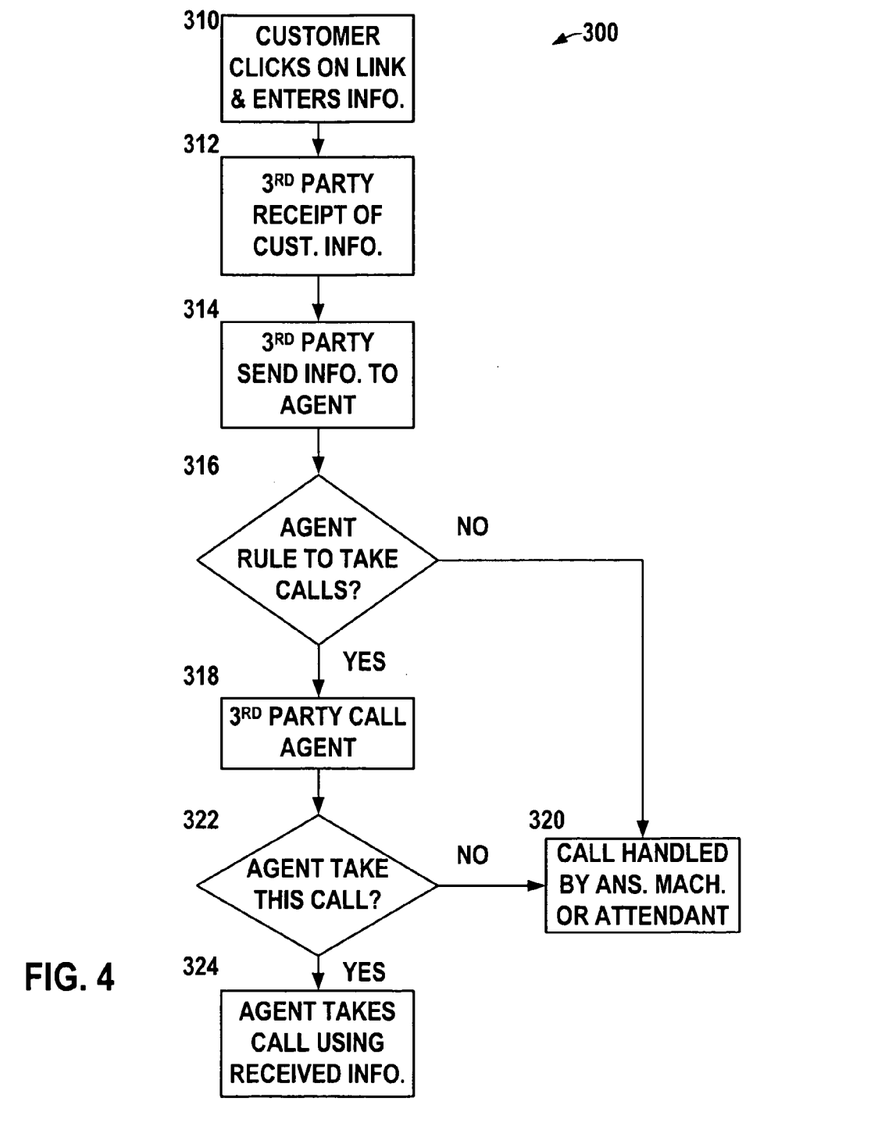
FIG. 4 is a flowchart illustrating a process for establishing communications between the customer and the agent based on a link.

In this scenario, illustrated by the flowchart in FIG. 4, a customer seeks to contact an agent by a web-initiated click-to-contact. The steps 300 are as follows:

1. A customer clicks a link or button on a document (e.g., e-mail, web site, etc.) 310;
2. A pop-up window (see FIG. 1 for an example window) prompts the customer for the customer's telephone number and additional information requested by the agent. For example, the additional information may be demographic information such as the customer's address, which product or products they are enquiring about or are interested in buying. The customer enters this information 310;

3. The third-party click-to-contact provider receives the customer's telephone number and additional information that is sent 314.
4. In parallel, the information is sent to the agent using an instant messaging client and a call is placed 318 by the third-party to the agent's telephone or telephones based on click-to-call settings that the agent has established with the third-party click-to-contact provider. For example, a different telephone number may be used based on the time of day (e.g., regular business hours vs. after hours) or day of week (e.g., weekdays vs. weekends). If the agent has established with the third-party via a rule that it will not take calls of this characteristic 316, then the call is handled by an answering machine or attendant 320;
5. The agent answers the phone and may be asked if they want to take this specific call 322. They review the information sent to them via an instant message screen-pop and either accept 324 or reject 320 the call.
6. If the agent rejects the call 320 it may be sent to an automated attendant or voice mail facility.

Scenario 2—Call to Agent

Figure 5:
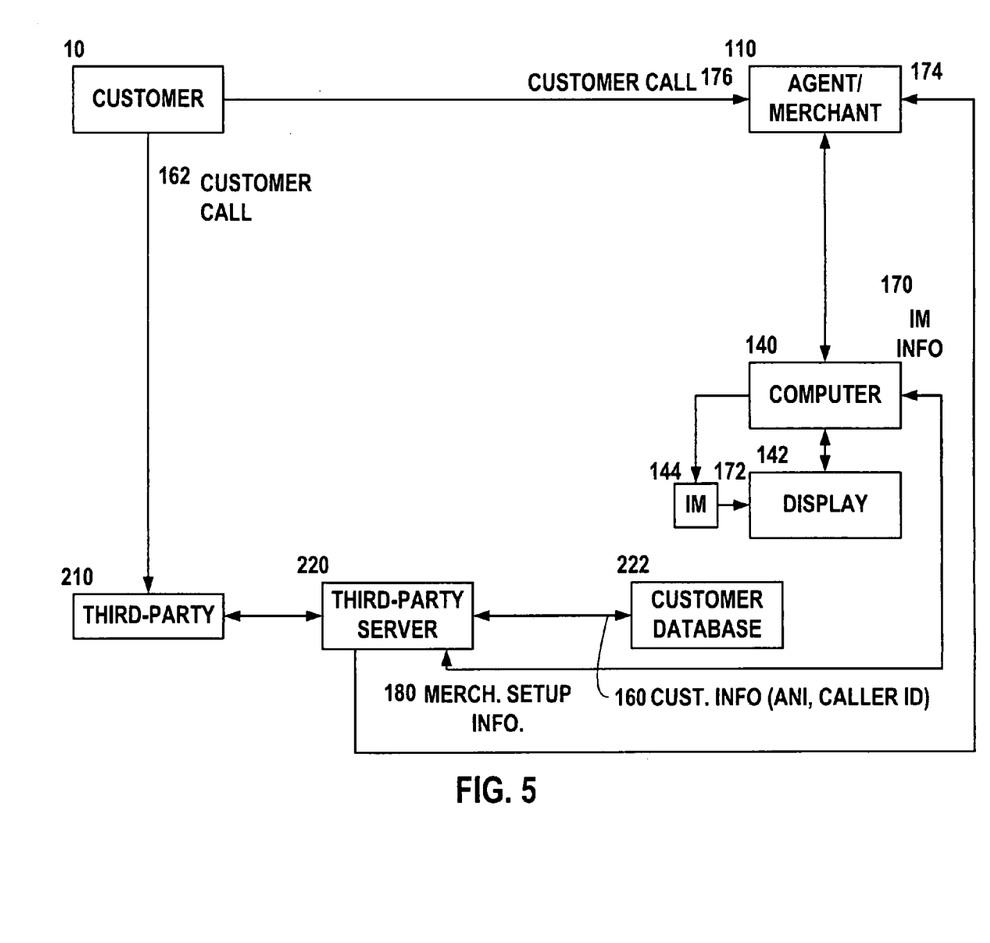
FIG. 5 is a block diagram illustrating the primary components according to an embodiment of the invention in which the customer initiates a telephone call to the agent.

FIG. 5 is block a diagram similar to that shown in FIG. 1, but significantly simplified, since the computer 20 of the customer 10 and the server 120 of the agent 110 are not necessary. In this scenario, the only customer 10 interactions involve the original customer call 162 directed to the third-party 210, and the ultimate connection 176 to the agent 110.

Figure 6:
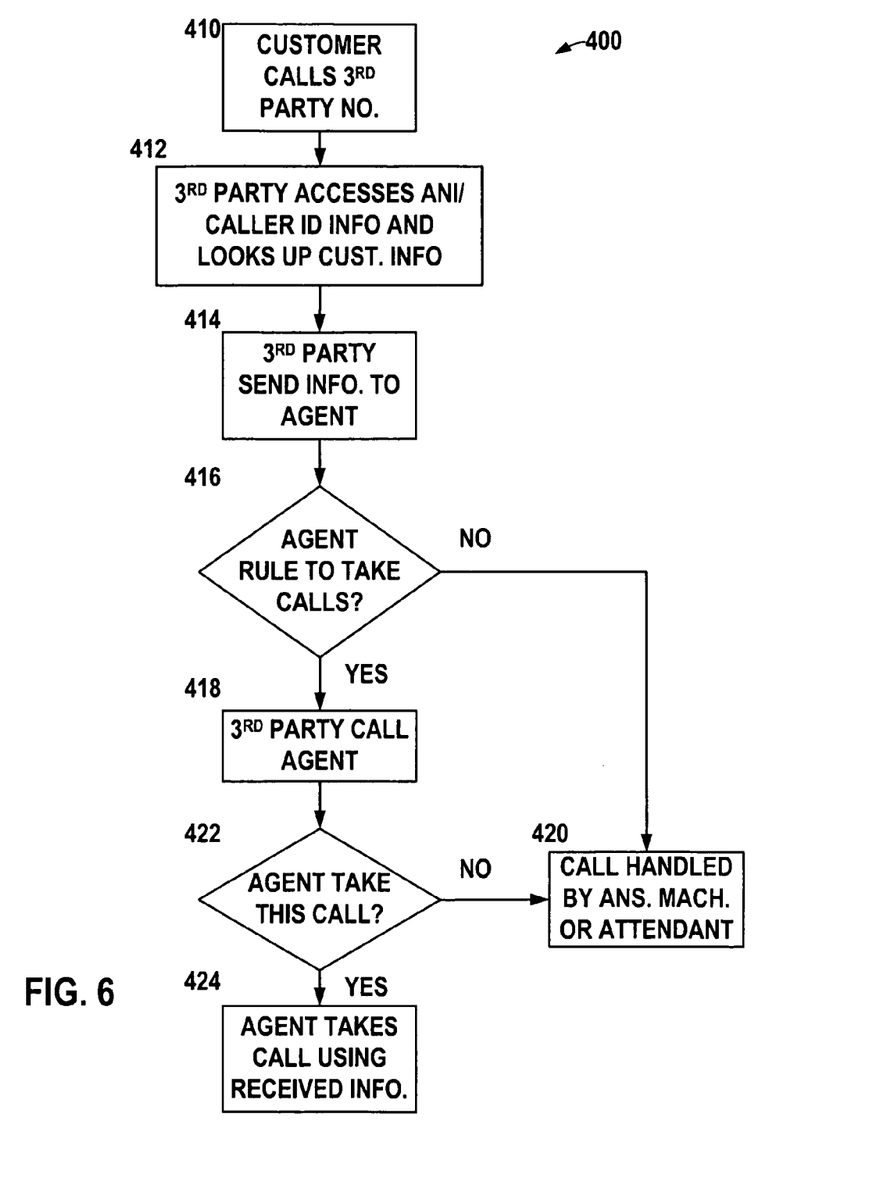
FIG. 6 is a flowchart illustrating a process for establishing communications between the customer and the agent based on a customer-initiated telephone call.

FIG. 6 is a flowchart illustrating this scenario. The steps 400 are as follows:

1. A customer calls a phone number assigned to the agent, but physically associated with the third-party (e.g., using a toll-free number assigned by the third-party click-to-contact provider) 410;
2. At the third-party click-to-contact provider, the ANI or received caller-ID information from the customer's call is used to look up available demographic information of the customer (e.g., via a customer database and/or the Internet) 412;
3. In parallel, the number called (the specific toll free number) and the demographic information are sent to the agent using an instant messaging client and a call is placed to the agent (e.g., based on the time of day and day of week) 414. If the agent has established with the third-party via a rule that it will not take calls of this characteristic 416, then the call is handled by an answering machine or attendant 420;
4. The agent reviews the information sent to them via an instant message screen-pop. Substantially simultaneously, the agent receives a call on his or her phone and is asked 422 if they want to take the call. They review the information sent to them via an instant message screen-pop and either accept 424 or reject 420 the call.
5. If the agent rejects the call 420 it is sent to an automated attendant or voice mail facility.

In instances when the agent 10 has a "virtual" or mobile office or is otherwise unable to receive an instant messenger screen-pop 170 on the agent's mobile device 140 (e.g., a mobile phone), the steps in the foregoing scenarios of sending information to the agent using an instant messenger screen pop 170 may alternatively be performed by sending the agent a short message service (SMS) message or text message 170 with the customer's information.

Furthermore, although the foregoing scenarios describe establishing parallel voice 174 and text 170 communication with the agent 10, it should be appreciated that only text 170 communication may be needed, particularly if the customer 10 has only requested an IM or "chat" type session with the agent 110. This may occur, for example, when the customer 10 has only one phone line that the customer is using for modem connection to a dial-up Internet service provider.

Since most computers or mobile devices include one or more pre-installed instant messenger client applications, no specialized software specific to the agent's telephone equipment is needed to utilize the present method. According to the present method, a small to medium sized business may now enjoy the benefit of screen-pop functionality with "virtual" and/or mobile customer service agents without having to purchase, install and maintain complex CTI systems and software.

In some embodiments of the present method, the merchant/agent 110 may be provided with a unique URL as the link 152 to leverage the conventional functionality of document-displaying client applications 30 (e.g., email clients 32, web browsers 34, etc.) that convert alphanumeric plain text URLs (i.e., text strings starting with www or http://) to clickable links (i.e., hypertext).

By providing the merchant with a unique URL, the merchant may easily type the plain text URL 152 (or alternatively cut/copy and paste the plain text URL) on a web page, in a blog, in the body of an email message or in an email signature (as the "document" 150). When the URL 152 is sent to a customer 10 (e.g., due to a web-based resource request, or as a one-to-one or broadcast message such as email, IM, text message, etc.), the client application 30 (e.g., email application 32, web browser application 34, etc.) automatically presents the URL to the customer as a clickable link 152 to facilitate telephonic and/or text-based contact 176 between the customer 10 and an agent 110 of the merchant.

Scenario 3—Contact Agent by Web-Initiated Click-to-Contact with Mnemonic URL

In embodiments of the present method that employ click-to-call where the URL link 152 advantageously includes a mnemonic, such as "www.contact-me-now.com/npanxx3125551212" (in which npanxx3125551212 is or points to one or more of the merchant's agent phone number or numbers), the following example call set-up may be used:

1. The phone number ((312) 555-1212) is stripped off the end of the URL or otherwise parsed from the URL based on the delimiting character.
2. The phone number is authenticated.
3. The customer's telephone number is determined from the received information, which may com from, e.g., the pop-up or web-based form that the user fills out. The customer's telephone number may be analyzed, evaluated or otherwise compared to settings/rules (e.g., disallowing international or long distance calls) that the merchant has established with the click-to-contact provider.
4. Pass the two numbers to a soft telephone switch (click-to-contact provider's equipment) where the agent and customer are connected (e.g., two calls may be placed and then bridged together).

The system or systems may be implemented on any general purpose computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

TABLE OF REFERENCE CHARACTERS 10 customer
20 customer computer
22 customer computer display
24 customer computer input device
30 customer application programs
32 web browser/client
34 e-mail client
36 pop-up window
110 merchant/agent
120 merchant/agent server
122 e-mail server
124 web server
140 merchant/agent computer or mobile device
142 agent computer display
144 instant messenger
150 document/data structure (e-mail, web page)
152 document link
154 customer form
160 customer information
162 customer call
170 instant messaging customer information (or SMS, text message)
172 screen pop
174 third-party call to agent
176 customer call to agent or agent accepting customer call or other form of communication
180 merchant setup information
210 third-party click-to-contact provider
220 third-party server
222 customer database
300-324 method flowchart elements for Scenario 1
400-424 method flowchart elements for Scenario 2

What is claimed is:

1. A method for establishing interactive communications between a customer and a merchant, comprising:
    assigning a phone number to the merchant and physically associating the phone number with a third-party;
    the customer calling the phone number at a contact time;
    the third party utilizing Automatic Number Identification (ANI) or received caller-ID information to look up additional demographic information from a data source;
    the third party sending the additional demographic information to the merchant using an instant messaging client as a screen pop approximately at the contact time;
    if a rule has been established with the merchant that it will not take the call having characteristics of the call, then transferring the call to an answering machine or an attendant;
    otherwise
    the merchant reviewing the additional demographic information;
    the third party calling the merchant and asking if the merchant wishes to receive the call;

if the merchant wishes to receive the call, then transferring the customer call to the merchant, otherwise, transferring the call to the answering machine or the attendant; and the merchant engaging in interactive communications with the customer approximately at the contact time.

2. A method for establishing interactive telephone communications between a customer and a merchant, comprising:

a third party receiving a call from a customer at a phone number established by and associated with the third party and assigned to a merchant by the third party, the call received at a contact time;

the third party utilizing at least one of Automatic Number Identification (ANI) and received caller-ID information to look up at least one of calling history, customer information, and demographic information for the customer from a data source;

the third party sending the at least one of calling history, customer information, and demographic information to the merchant using an electronic text communications medium;

if a rule has been established that the merchant will not take a call having a characteristic included in the at least one of calling history, customer information, and demographic information of the call, then transferring the call to an answering machine or an attendant;

otherwise:

after sending the at least one of calling history, customer information, and demographic information to the merchant, the third party contacting the merchant to determine if the merchant wishes to receive the call; and if the third party determines that the merchant wishes to receive the call, then the third party transferring the call to the merchant to enable the merchant to engage in interactive communications with the customer.

3. The method of claim 2, wherein the customer information comprises the customer's name and at least one of a physical address, an e-mail address, and a telephone number.

4. The method of claim 2, wherein the customer information comprises a mode for contacting the customer.

5. The method of claim 2, wherein the customer information comprises an instant messaging address.

6. The method of claim 2, wherein the customer information comprises at least one product about which the customer is inquiring.

7. The method of claim 2, further comprising:

the third party establishing a plurality of phone numbers associated with the third-party; and the third party assigning the plurality of phone numbers to the merchant for use at different times.

8. The method of claim 2, wherein the rule comprises that the merchant will not take the call having the characteristic of the call during at least one period of time, but will take the call during at least one other period of time.

9. The method of claim 2, wherein the third party looking up the at least one of calling history, customer information, and demographic information from a data source comprises:

the third party accessing stored customer information in a customer database via a server; and the third party sending the stored customer information to the merchant using the electronic text communications medium approximately at the contact time.

10. The method of claim 2, further comprising the third party sending the at least one of calling history, customer information, and demographic information to storage according to the rule.

11. The method of claim 2, further comprising the third party sending the at least one of calling history, customer information, and demographic information to storage if the third party determines that the merchant does not wish to receive the call.

12. The method of claim 2, further comprising the third party sending the at least one of calling history, customer information, and demographic information to storage according to the contact time.

13. The method of claim 2, wherein the third party utilizing ANI or received caller-ID information to look up at least one of calling history, customer information, and demographic information from a data source comprises a server of the third party accessing the at least one of calling history, customer information, and demographic information via a customer database.

14. The method of claim 2, wherein the third party contacts the merchant after sending the at least one of calling history, customer information, and demographic information to the merchant by calling the merchant.

15. The method of claim 2, wherein the electronic text communications method includes an instant message that causes an instant messenger screen-pop at a display.

16. The method of claim 2, wherein the electronic text communications method includes a Short Message Service (SMS) message.

17. The method of claim 2, wherein the electronic text communications method includes a text message.

18. The method of claim 2, further comprising, if a rule has not been established that the merchant will not take the call having the characteristic of the call, and if the third party does not determine that the merchant wishes to receive the call, the third party transfers the call to the answering machine or the attendant.

19. The method of claim 2, further comprising:

the third party establishing the phone number associated with the third-party; and the third party assigning the phone number to the merchant.

20. The method of claim 2, wherein the third party sends the at least one of calling history, customer information, and demographic information to the merchant using an electronic text communications medium approximately at the contact time.

21. The method of claim 2, wherein the characteristic included in the at least one of calling history, customer information, and demographic information includes at least one characteristic selected from the group consisting of customer name, customer telephone number, customer e-mail address, and calling time.

22. The method of claim 2, wherein the characteristic included in the at least one of calling history, customer information, and demographic information includes an indication as to whether the call is a long-distance or international call.

23. The method of claim 2, wherein the third party sending the at least one of calling history, customer information, and demographic information to the merchant includes sending a link to the at least one of calling history, customer information, and demographic information in the data source.

24. The method of claim 2, wherein the third party sending the at least one of calling history, customer information, and demographic information to the merchant includes sending a link to the data source to facilitate the merchant entering data regarding at least one of calling history, customer information, and demographic information pertaining to the customer in the data source.

25. The method of claim 2, wherein the third party sending the at least one of calling history, customer information, and demographic information to the merchant includes:
- if the third party utilizing at least one of ANI and received caller-ID information to look up at least one of calling history, customer information, and demographic information for the customer from the data source finds available information, sending a link to the at least one of calling history, customer information, and demographic information in the data source;
- otherwise, if the third party utilizing at least one of ANI and received caller-ID information finds no available information on the at least one of calling history, customer information, and demographic information for the customer from the data source, sending a link to the data source to facilitate the merchant entering data regarding at least one of calling history, customer information, and demographic information pertaining to the customer in the data source.

26. A method for establishing interactive telephone communications between a customer and a merchant, comprising:
- a third party establishing a phone number associated with the third-party;
- the third party assigning the phone number to a merchant;
- the third party receiving a call from a customer to the phone number at a contact time;
- the third party utilizing at least one of Automatic Number Identification (ANI) and received caller-ID information by a server to access at least one of calling history, customer information, and demographic information for the customer via a customer database;
- the third party sending the at least one of calling history, customer information, and demographic information to the merchant using an electronic text communications medium, the electronic text communications medium comprising at least one selected from group consisting of an instant message that causes an instant messenger screen-pop at a display, a Short Message Service (SMS) message, and a text message;
- if a rule has been established that the merchant will not take a call having a characteristic included in the at least one of calling history, customer information, and demographic information of the call, then transferring the call to an answering machine or an attendant;
- otherwise:
  - after sending the at least one of calling history, customer information, and demographic information to the merchant, the third party contacting the merchant to determine if the merchant wishes to receive the call; and
  - if the third party determines that the merchant wishes to receive the call, then the third party transferring the call to the merchant to enable the merchant to engage in interactive communications with the customer.

27. The method of claim 26, further comprising, if a rule has not been established that the merchant will not take the call having the characteristic of the call, and if the third party does not determine that the merchant wishes to receive the call, the third party transfers the call to the answering machine or the attendant.

* * * * *